J. DIERDORFF.
BELT CONVEYER.
APPLICATION FILED APR. 24, 1911.
1,062,325.
Patented May 20, 1913.
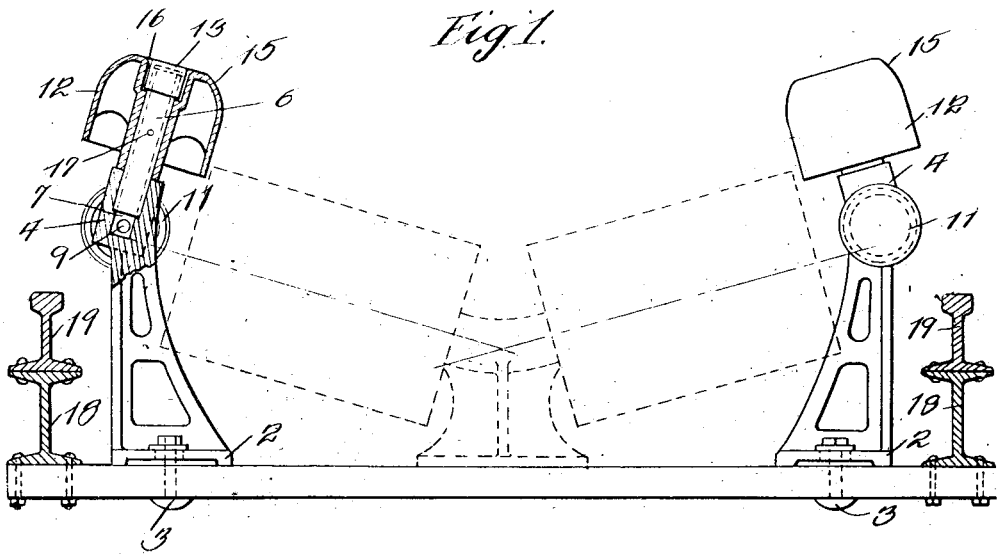
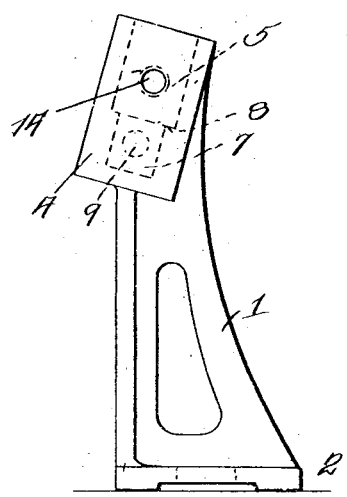
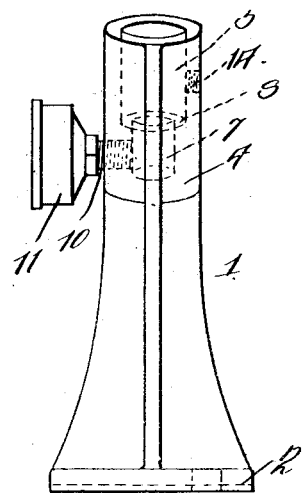
Witnesses
Inventor
Joseph Dierdorff
By H. H. Bliss
Attorney

UNITED STATES PATENT OFFICE.

JOSEPH DIERDORFF, OF COLUMBUS, OHIO, ASSIGNOR TO THE JEFFREY MANUFACTURING COMPANY, A CORPORATION OF OHIO.

BELT CONVEYER.

1,062,325.  Specification of Letters Patent.  Patented May 20, 1913.

Application filed April 24, 1911. Serial No. 623,023.

*To all whom it may concern:*

Be it known that I, JOSEPH DIERDORFF, a citizen of the United States, residing at Columbus, in the county of Franklin and State of Ohio, have invented certain new and useful Improvements in Belt Conveyers, of which the following is a specification, reference being had therein to the accompanying drawing.

This invention relates to improvements in guide idlers for conveyer belts. One advantage of this device is the reduction of the over-all width of the idlers which must be brought within the tread of the belt tripping carriage. It is necessary that the outer dimensions of idlers should be brought as near as possible to the edges of the belt so that the belt tripping carriage may be restricted to the smallest possible tread. It is obvious that with very wide belts the axles of the tripper carriage are necessarily very long, and any slight reduction that may be obtained is of material advantage.

Referring to the drawings: Figure 1 is a side elevation of two guide idler pulleys mounted on each side of typical troughing pulleys, one of the idlers being shown in elevation and the other in a partial vertical sectional view. Fig. 2 is a side elevation of the guide idler bracket, and Fig. 3 is an end elevation of the same.

Referring to the drawings, 1 represents an upright standard of substantially T-shaped cross section formed upon the base 2 which is provided with suitable holes to retain the fastening bolts 3. At the upper end of the standard and formed integral therewith is a cylindrical portion 4 slightly inclined in the plane of the leg of the T-shaped standard and provided with an opening 5 of the same diameter as the hole or tubular shaft 6 which is adapted to fit therein. The opening 5 is extended below the end of the shaft 6 and is restricted as at 7, thereby forming a shoulder 8 which prevents the forcing of the tubular shaft below that point. A hole 9 is drilled from the side of the bracket into the constricted portion of the opening and is tapped to receive the shank 10 of a grease cup 11. A guide idler 12 is placed upon the tubular shaft 6 and is retained in place by a cap 13 fastened over the outer end of the tubular shaft 6. A hole 14 is tapped into the side of the enlarged portion of the opening 5 and receives a set screw adapted to retain the lower end of the tubular shaft 6 within this opening.

The guide idler has its upper end reduced in diameter as at 15, thereby producing a rounded off upper surface. A recess is formed in the upper end of the guide idler as at 16 to receive the cap 13 which is thus placed well within the idler. Radial holes 17 are provided in the tubular shaft 6 so that a lubricant may be forced from the grease cup 11 into the tubular shaft and thus lubricate the idler bearing. The grease cup 11 is located at the side of the bracket so that it does not increase the over-all measurement of the idlers when located on each side of the belt.

The depth and diameter of the opening in the top of the pulley is such that the cap placed on the end of the tubular shaft will fit entirely within the outlines of the idler. This provides a smooth surface on which it is impossible for the belt to become torn or injured and adds materially to the neatness and general appearance of the design.

The lower end of the opening in which the tubular shaft is fitted is constricted so that when the shaft 6 is put in place, it is impossible to drive it far enough into the opening to close the hole leading to the grease cup. This greatly simplifies the construction and facilitates the assembling of the device.

In the construction illustrated, the cross member, on which the base of the bracket is fastened, is shown bolted to the lower flange of I-beams 18 on the upper flanges of which are mounted the rails 19 on which the belt tripper travels.

The upper surfaces of the guide idlers are rounded off so that when the belt is raised from the troughing idlers to pass over the tripping mechanism, it is impossible for the edges of the belt to be injured as is often the case with the ordinary type of idler. The same is true when the belt is returned to the troughing idlers after having passed over the tripping mechanism.

What I claim is:

1. The combination of a conveyer belt guide idler having its operative face at one end tapered toward its axis and provided with an axial opening, and a supporting shaft within the opening and having one end flush with the smaller end of the idler.

2. The combination of a conveyer belt guide idler having the upper portion of its active face tapered toward its axis and provided with an axial opening the upper end of which is enlarged, a supporting shaft positioned within the opening, and a cap secured on the end of the shaft and located entirely within the enlarged portion of the said opening.

3. The combination of a conveyer belt guide idler having its active face tapered inward at one end in an unbroken surface to the periphery of an axial opening in the idler, and a supporting shaft positioned within the said opening and terminating at one end flush with the smaller end of the idler.

4. The combination with a conveyer belt guide idler having its upper active face continued in a curved unbroken surface to the edge of an axial opening in the idler, of the supporting shaft positioned within the said opening, and means confined entirely within the opening for preventing axial movement of the idler on the said shaft in the direction of its smaller end.

5. The combination of a conveyer belt guide idler having an axial opening enlarged at its upper end, the active face of the idler being continued in a curved unbroken surface at its upper end to the edge of the said opening, the supporting shaft located in the opening, and a cap secured upon the upper end of the shaft and fitting snugly within the enlarged portion of the opening.

6. The combination of a conveyer belt guide idler having an axial opening, the upper active face of the idler being continued in a curved unbroken surface to the edge of the said opening, the supporting shaft positioned within the opening, and securing means on the end of the shaft for retaining the idler upon the said shaft the said securing means being located flush with the end of the idler and extending to the edges of the axial opening.

In testimony whereof I affix my signature, in presence of two witnesses.

JOSEPH DIERDORFF.

Witnesses:
 H. R. WOLFF,
 DUDLEY T. FISHER.